US007996585B2

(12) United States Patent
Easton et al.

(10) Patent No.: US 7,996,585 B2
(45) Date of Patent: Aug. 9, 2011

(54) METHOD AND SYSTEM FOR STATE TRACKING AND RECOVERY IN MULTIPROCESSING COMPUTING SYSTEMS

(75) Inventors: Janet R. Easton, Woodstock, NY (US); Elke Nass, Ehningen (DE); Kenneth J. Oakes, Wappingers Falls, NY (US); Andrew W. Piechowski, Lagrangeville, NY (US); Martin Taubert, Gaertringen (DE); John S. Trotter, Pleasant Valley, NY (US); Ambrose Verdibello, Millbrook, NY (US); Joachim von Buttlar, Schoenaich (DE); Robert Whalen, Jr., Tivoli, NY (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 11/223,733

(22) Filed: Sep. 9, 2005

(65) Prior Publication Data
US 2007/0150709 A1    Jun. 28, 2007

(51) Int. Cl.
*G06F 3/00* (2006.01)
*G06F 5/00* (2006.01)
*G06F 15/00* (2006.01)
*G06F 15/76* (2006.01)

(52) U.S. Cl. ............... 710/36; 710/37; 712/10; 712/15
(58) Field of Classification Search ............ 710/36; 712/29
See application file for complete search history.

(56) References Cited

U.S. PATENT DOCUMENTS

| 4,435,766 | A | * | 3/1984 | Haber et al. ............ 710/200 |
| 4,742,447 | A |   | 5/1988 | Duvall et al. |
| 5,274,809 | A | * | 12/1993 | Iwasaki et al. ............ 718/104 |
| 5,313,584 | A | * | 5/1994 | Tickner et al. ............ 710/37 |
| 5,414,851 | A | * | 5/1995 | Brice et al. ............ 718/104 |
| 5,590,281 | A |   | 12/1996 | Stevens |
| 5,634,037 | A |   | 5/1997 | Sasaki et al. |
| 5,761,413 | A |   | 6/1998 | Frank et al. |
| 5,768,572 | A |   | 6/1998 | George et al. |
| 5,842,208 | A |   | 11/1998 | Blank et al. |
| 6,014,756 | A |   | 1/2000 | Dottling et al. |
| 6,047,384 | A |   | 4/2000 | Pühl et al. |
| 6,199,179 | B1 |  | 3/2001 | Kauffman et al. |
| 6,594,785 | B1 |  | 7/2003 | Gilbertson et al. |

(Continued)

FOREIGN PATENT DOCUMENTS
EP    0343646 A2    11/1989
(Continued)

*Primary Examiner* — Eddie P Chan
*Assistant Examiner* — George D Giroux
(74) *Attorney, Agent, or Firm* — Scully, Scott, Murphy & Presser, P.C.; John E. Campbell

(57) ABSTRACT

Disclosed are a method and system of tracking real time use of I/O control blocks on a processing unit basis, in a multiprocessing system, such that in the case of a processing unit failure, a list accurately and concisely identifies the control blocks that need to be recovered. This eliminates the need to scan all the I/O control blocks, greatly reducing the overall system recovery time and minimizing impact to the rest of the running system. The preferred embodiment of the invention uses a task control block structure to record which I/O control blocks are in use by each Processing Unit. Also, the lock word structure defined in the I/O control blocks is provided with an index back into the task control block to facilitate managing the task control block entries.

19 Claims, 4 Drawing Sheets

U.S. PATENT DOCUMENTS

| | | |
|---|---|---|
| 6,675,175 B2 | 1/2004 | Branch et al. |
| 6,748,438 B2 | 6/2004 | Palmer et al. |
| 6,823,472 B1 | 11/2004 | DeKoning et al. |
| 6,826,656 B2 | 11/2004 | Augsburg et al. |
| 6,834,385 B2 | 12/2004 | Bohm et al. |
| 6,839,813 B2 | 1/2005 | Chauvel |
| 6,842,825 B2 | 1/2005 | Geiner et al. |
| 6,845,470 B2 | 1/2005 | Austen et al. |
| 6,851,072 B2 | 2/2005 | Lasserre et al. |
| 6,886,064 B2 | 4/2005 | Dawkins et al. |
| 2002/0062459 A1 | 5/2002 | Lasserre et al. |
| 2002/0069327 A1 | 6/2002 | Chauvel |
| 2003/0061537 A1 | 3/2003 | Cha et al. |

FOREIGN PATENT DOCUMENTS

| | | |
|---|---|---|
| WO | WO 03/045035 A2 | 5/2003 |

* cited by examiner

FIG. 3

| LOCK OWNER | | EXTENDED LOCK INFORMATION | |
|---|---|---|---|
| BITS 00-07 | BITS 08-15 | BITS 16-23 | BITS 24-31 |
| 40 | 1F | 00 | 00 |

FIG. 5

USE OF THE TCB DURING RECOVERY

500

- 502 VALIDATE THE TCB'S CONTENT
- 504 DISPATCH RECOVERY ALGORITHMS
- 506 INTERROGATE THE TCB TO LOCATE THE CONTROL BLOCK TYPES TO BE RECOVERED
- 510 EXECUTE THE ALGORITHM LOGIC TO RECOVER THE CONTROL BLOCKS

METHOD AND SYSTEM FOR STATE TRACKING AND RECOVERY IN MULTIPROCESSING COMPUTING SYSTEMS

CROSS REFERENCE TO RELATED APPLICATIONS

This application is related to co-pending application Ser No. 11/223,725, for "Method And System To Execute Recovery In Non-Homogeneous Multiprocessor Environments," filed herewith; application Ser. No. 11/223,701, for "Method And System To Detect Errors In Computer Systems By Using State Tracking," filed herewith; and application Ser. No. 11/223,877, for "Method And System To Recover From Control Block Hangs In A Heterogeneous Multiprocessor Environment," filed herewith. The disclosures of the above-identified applications are herein incorporated by reference in their entireties.

BACKGROUND OF THE INVENTION

1. Field of the Invention

The present invention in general relates to computer systems, and in particular to multiprocessing systems. Even more specifically, the invention relates to state tracking and recovery in multi-processing computing systems.

2. Background Art

Multiprocessor computer systems are becoming increasingly important in modern computing because combining multiple processors increases processing bandwidth and generally improves throughput, reliability and serviceability. Multiprocessing computing systems perform individual tasks using a plurality of processing elements, which may comprise multiple individual processors linked in a network, or a plurality of software processes or threads operating concurrently in a coordinated environment.

Many early multiprocessor systems were comprised of multiple, individual computer systems, referred to as partitioned systems. More recently, multiprocessor systems have been formed from one or more computer systems that are logically partitioned to behave as multiple independent computer systems. For example, a single system having eight processors might be configured to treat each of the eight processors (or multiple groups of one or more processors) as a separate system for processing purposes. Each of these "virtual" systems would have its own copy of an operating system, and may then be independently assigned tasks, or may operate together as a processing cluster, which provides for both high speed processing and improved reliability.

The International Business Machines Corporation zSeries servers have achieved widespread commercial success in multiprocessing computer systems. These servers provide the performance, scalability, and reliability required in "mission critical environments." These servers run corporate applications, such as enterprise resource planning (ERP), business intelligence (BI), and high performance e-business infrastructures. Proper operation of these systems can be critical to the operation of an organization and it is therefore of the highest importance that they operate efficiently and as error-free as possible, and rapid problem analysis and recovery from system errors is vital.

In normal operation, a partitioned system operates in parallel, that is, the operations being performed by the partitions can occur simultaneously as the partitions share the operational resources of the server. With everything functioning properly, the various partitions, which may be operating using different operating system, perform their functions simultaneously.

There are certain critical functions, however, that require serialization of the system for a short period of time. Serialization is the forcing of operations to occur in a serial, rather than parallel, fashion, even when the operations could be performed in parallel. Serialization is typically mandatory when the correctness of the computation depends upon or might depend upon the exact order of computation, or when an operation requires uninterrupted use of otherwise shared hardware resources (e.g., I/O resources) for a brief time period.

The IBM zSeries server product line provides Enterprise Level Computing solutions which place great importance on maintaining a very high level of system availability and thus on recovering from system errors. The zSeries Channel Subsystem (CSS) has matured to support large I/O configurations, but because of this, increased time may be needed to recover the I/O Subsystem when the system encounters an error.

This CSS maintains a logical representation of the system's I/O Configuration state via internal data structures or controls blocks. These control blocks are used to serialize Processing Unit (PU) operations in a Multi-Processing (MP) environment and contain state information for the various operations and tasks that the CSS executes.

A PU executing an I/O operation will acquire and release locks on control blocks as part of I/O processing. If a PU fails during an I/O operation, it is necessary to locate and recover the control blocks held by the failing Processor. The current CSS recovery design employs a "scan" recovery method of all I/O control blocks in the system configuration, looking for control blocks that were in use by the failing Processor Unit (PU). This method is time consuming when all I/O controls blocks must be scanned and evaluated to locate the few that actually require recovery.

The resultant recovery times can also affect the overall system operation:
  Recovery has the highest priority, other normal operations requiring the processor doing recovery will be delayed, sometimes long enough to require additional recovery;
  Other processes which require only one or more control blocks being recovered may have to wait excessive amounts of time for the control block to be freed by recovery, again sometimes long enough to require additional recovery.

These recovery times are increasing because the number of I/O control blocks allocated per channel on the zSeries servers has increased. Specifically, the number of control blocks on the zSeries servers has increased from 512 K per system to over 7000 K per system.

SUMMARY OF THE INVENTION

An object of the present invention is to improve recovery procedures in multi-processing computing systems.

Another object of this invention is to eliminate the need to scan all the I/O control blocks in a multiprocessor system in order to identify the control blocks that need to be recovered.

A further object of the invention is to track real time use of I/O control blocks on a processing unit basis, in a multiprocessor system, such that in the case of a processing unit failure, a list accurately and concisely identifies the control blocks that need-to be recovered.

These and other objectives are attained with a method and system of tracking real time use of I/O control blocks on a processing unit basis, in a multiprocessing system, such that in the case of a processing unit failure, a list accurately and concisely identifies the control blocks that need to be recovered. This eliminates the need to scan all the I/O control blocks, greatly reducing the overall system recovery time and minimizing impact to the rest of the running system.

The preferred embodiment of the invention, described below in detail, uses the following infrastructure features:

Task Control Blocks (TCB) which are used to record which I/O control blocks are in use by each PU. Each PU is preferably assigned 2 TCBs to support the dual operation modes of the PU, i390 mode and millicode mode.

A Lock Word structure defined in the I/O Control Blocks to include an index back into the TCB to facilitate managing the TCB entries.

A Lock Word structure defined in the I/O Control Blocks to include a unique routine identification code to track task usage of control blocks.

Algorithms to use the TCB content to define and direct the scope of the required recovery action.

The preferred embodiment of the invention provides a number of important advantages. For instance, the invention may be used to provide significant improvement in the recovery time, especially for larger configurations.

a. Improved system throughput because shared resources will be freed up faster.

b. Reduced impact to time-critical functions that required System Assist Processor (SAP) resources.

Also, with the preferred embodiment of the invention, the system recovery time is nearly constant, instead of scaling with the size of the configurations, thus removing a major inhibitor to even larger configurations. Further, more validation of controls blocks is enabled because additional information is stored in the lock word and TCB.

In addition, the invention may be used to allow development of new applications to improve the overall reliability of future generations because of the availability of the infrastructure described herein, and to provide improved diagnostics with lock word changes to include a "routine id" to identify the code segment that had locked the control block.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 3 shows a control block used in the preferred embodiment of the invention.

FIG. 5 is a flow chart showing a preferred recovery procedure using the task control blocks of the present invention.

DETAILED DESCRIPTION OF THE PREFERRED EMBODIMENT

Figure 1:
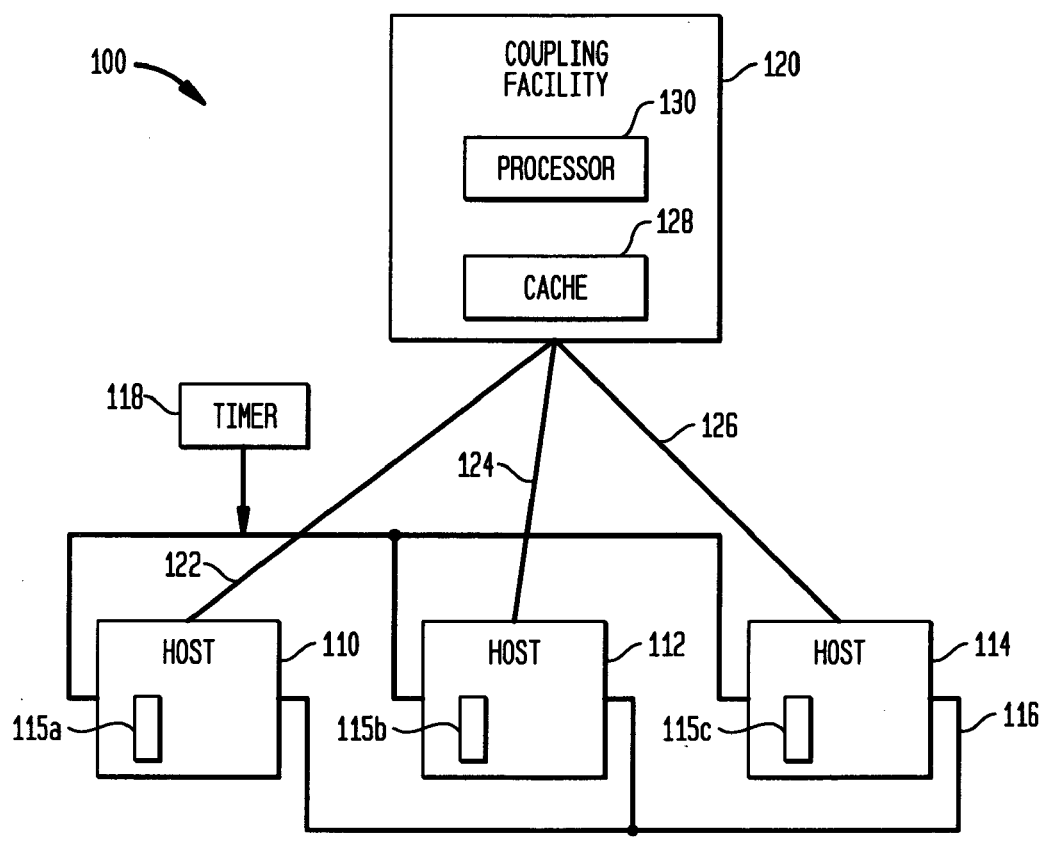
FIG. 1 illustrates a multi-processing computing system with which the present invention may be used.

FIG. 1 illustrates multiprocessor computer system 100 that generally comprises a plurality of host computers 110, 112, 114, which are also called "hosts". The hosts 110, 112, 114 are interconnected with host links 116, which may comprise, for example, Coupling Links, Internal Coupling Channels, an Integrated Cluster Bus, or other suitable links. Rather than using three hosts 110, 112, 114 as in the illustrated example, in alternative embodiments one, two, four, or more hosts may be used. System 100 also includes a timer 118 and a coupling facility 120.

Each host 110, 112, 114 itself is a multiprocessor system. Each host 110, 112, 114 may be implemented with the same type of digital processing unit (or not). In one specific example, the hosts 110, 112, 114 each comprise an IBM zSeries Parallel Sysplex server, such as a zSeries 900, running one or more of the z Operating System (z/OS). Another example of a suitable digital processing unit is an IBM S/390 server running OS/390. The hosts 110, 112, 114 run one or more application programs that generate data objects, which are stored external from or internal to one or more of the hosts 110, 112, 114. The data objects may comprise new data or updates to old data. The host application programs may include, for example, IMS and DB2. The hosts 110, 112, 114, run software that includes respective I/O routines 115a, 115b, 115c. It may be noted that other types of hosts may be used in system 100. In particular, hosts may comprise any suitable digital processing unit, for example, a mainframe computer, computer workstation, server computer, personal computer, supercomputer, microprocessor, or other suitable machine.

The system 100 also includes a timer 118 that is coupled to each of the hosts 110, 112, 114, to synchronize the timing of the hosts 110, 112, 114. In one example, the timer 118 is an IBM Sysplex®. Timer. Alternatively, a separate timer 118 may be omitted, in which case a timer in one of the hosts 110, 112, 114 is used to synchronize the timing of the hosts 110, 112, 114.

Coupling facility 120 is coupled to each of the hosts 110, 112, 114 by a respective connector 122, 124, 126. The connectors 122, 124, 126, may be, for example, Inter System Coupling (ISC), or Integrated Cluser Bus (ICB) connectors. The coupling facility 120 includes a cache storage 128 ("cache") shared by the hosts 110, 112, 114, and also includes a processor 130. In one specific example, the coupling facility 120 is an IBM z900 model 100 Coupling Facility. Examples of other suitable coupling facilities include IBM model 9674 C04 and C05, and IBM model 9672 R06. Alternatively, the coupling facility 120 may be included in a server, such as one of the hosts 110, 112, 114.

As an example, some suitable servers for this alternative embodiment include IBM z900 and S/390 servers, which have an internal coupling facility or a logical partition functioning as a coupling facility. Alternatively, the coupling facility 120 may be implemented in any other suitable server. As an example, the processor 130 in the coupling facility 120 may run the z/OS. Alternatively, any suitable shared memory may be used instead of the coupling facility 120. The cache 128 is a host-level cache in that it is accessible by the hosts 110, 112, 114. The cache 128 is under the control of the hosts 110, 112, 114, and may even be included in one of the host machines if desired.

In the operation of system 100, a processing unit (PU) executing an I/O operation will acquire and release locks on control blocks as part of the I/O processing. If a PU fails during an I/O operation, it is necessary to locate and recover the control blocks held by the failing processor. Prior art systems employ a scan recovery method of all I/O control blocks in the system configuration, looking for control blocks that were in use by the failing processor unit. While effective, this method is time consuming.

The present invention reduces the overall system recovery time. More specifically, the invention provides a method and system of tracking real time use of I/O control blocks on a processing unit basis, such that in the case of a processing unit failure, a list accurately and concisely identifies the control blocks that need to be recovered, eliminating the need to scan all the I/O control blocks.

In the preferred embodiment of the invention, this is accomplished by use of the following infrastructure features:

Task Control Blocks (TCB) which are used to record which I/O control blocks are in use by each PU. Each PU is preferably assigned 2 TCBs to support the dual operation modes of the PU, i390 mode and millicode mode.

A Lock Word structure defined in the I/O Control Blocks to include an index back into the TCB to facilitate managing the TCB entries.

A Lock Word structure defined in the I/O Control Blocks to include a unique routine identification code to track task usage of control blocks.

Algorithms to use the TCB content to define and direct the scope of the required recovery action.

The infrastructure described herein is preferably used in mainline I/O code as well as the I/O Subsystem Recovery code.

More specifically, the TCB will contain information about:
The control blocks being used by a PU while executing an I/O task.
PU task state footprint information.
If an error occurs the PU will store error type, error code, and extended error information in the TCB.

Figure 2:
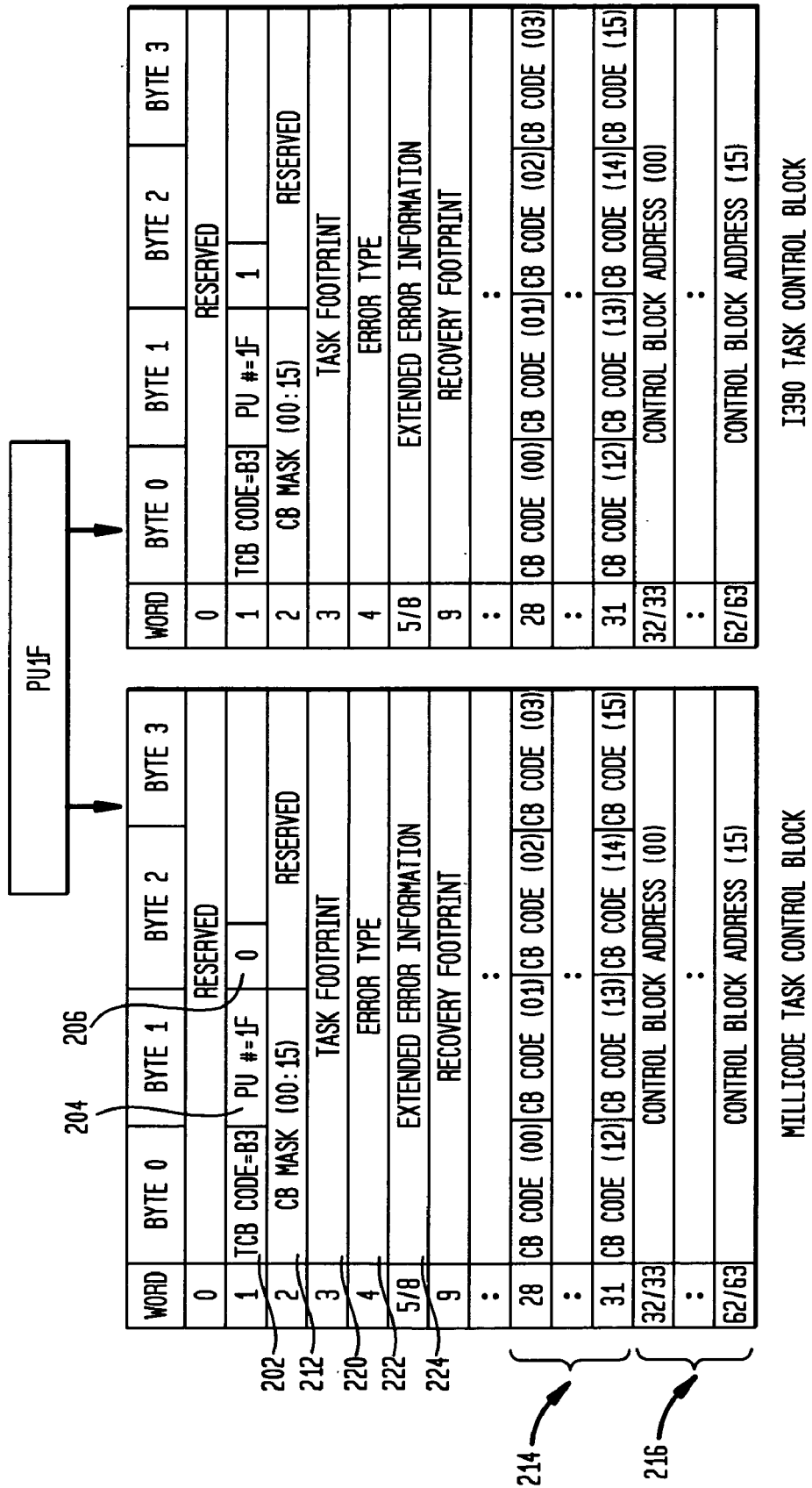
FIG. 2 shows task control blocks that may be used in this invention.

Each task running on the PU is assigned a TCB. For example, on the IBM zSeries servers, the PUs can execute in 2 modes, i390 mode or Millicode mode, thus there preferably will be 2 TCBs allocated for each PU. Defining unique TCBs per PU for I390 mode and Millicode mode allows greater interleaving of tasks that can occur when processors switch modes while processing functions by keeping the resources used separated. This structure is shown in FIG. 2.

Key TCB Field Definitions
 1. TCB Code field 202: Unique static hexadecimal value to identify TCB control block type.
 2. PU# field 204: Physical PU number owning the TCB.
 3. Mode field 206: Identifier for Millicode or I390 mode.
 4. Control Block Slot Arrays: Three 16 element arrays that contain:
  Control Block Mask (CBM) Array 212: Indicates that a Control block was locked or in the process of being locked.
  Control Block Code (CBC) Array 214.: Contains Control Block Code of the Control Block that was locked or being locked.
  Control Block Address (CBA) Array 216: Contains Control Block Address of the Control Blocks that was lock or being locked.
 5. Task Footprint field 220: Indicator of current task step executing on the PU.
 6. Error Code field 222: Unique Error data stored by failing task.
 7. Extended Error Information field 224: Additional data stored by failing task to aid in recovery or problem debug.

I/O Control Block Lock Controls
FIG. 3 illustrates the structure of an I/O control block. All I/O Control Blocks define Word 0 to contain control block lock data. The lock value is a 16 bit encoded value, bits 6-7 characterizing the locking element (PU type), bits 8-15 containing the PU number. This invention now defines bits 16-31 to contain Extended Lock Information data and will be used to contain either unique locking routine ids or TCB Index data.

Use of the TCB in the Mainline Code
The following is an example of a portion of an I/O operation to illustrate the use of the invention:
 1. During I/O Operations, control blocks need to be locked by the PU initiating the operation. As part of this process, the following steps are preferably taken:
  a. Examine the TCB to ensure that nothing remains in the TCB from the previous task.
  b. Locate an unused slot in the TCB.
  c. Save the Address of the control block to be locked and the control block code in that slot.
  d. Build lock word.
  e. Lock the control block.
 2. Perform the necessary state changes on the control block for the desired I/O function. For example, this I/O function may be handling pending status for I/O completion.
 3. At completion of the task, the control block will now need to be unlocked. As part of this process, the following steps are preferably taken:
  a. Unlock the control block by zeroing out the Lock Word.
  b. Release the TCB slot used in the locking of this control block leaving the TCB in its initial state ready for the next task.

Figure 4:
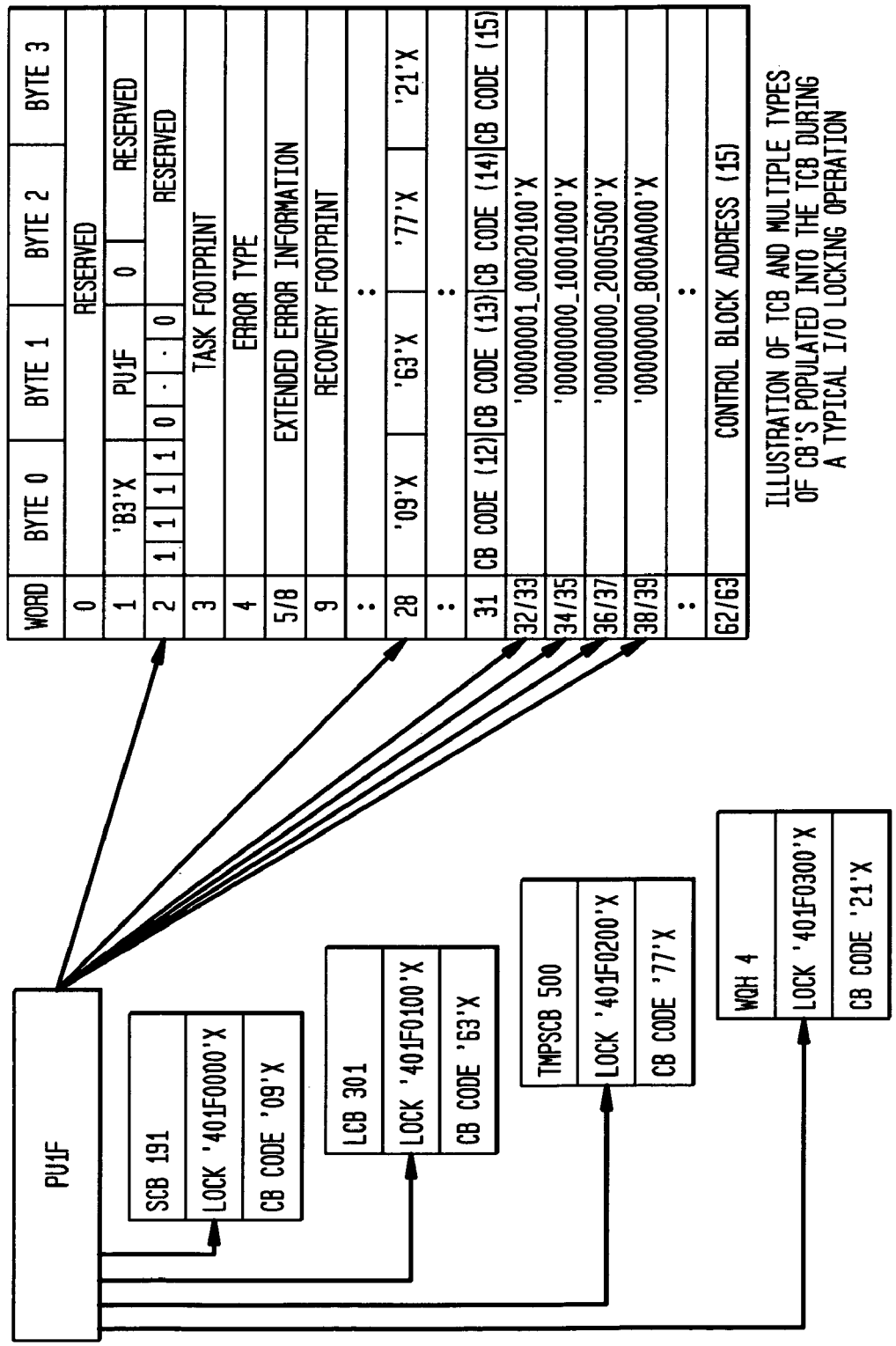
FIG. 4 illustrates the use of the task control blocks in the preferred operation of this invention.

A pictorial of what a TCB might look like as the PU execute an I/O operation is shown in FIG. 4.

Use of the TCB During Recovery
Should the PU performing the above task suffer a failure, recovery will need to be performed on its behalf. The TCBs for the failing PUs will be used by the I/O control block recovery code to direct the recovery operation. FIG. 5 generally shows a preferred recovery operation 500. First, at step 502, the recovery code will validate the TCBs contents to ensure that they are accurate and reliable. Secondly, at step 504, the mainline recovery code will then dispatch recovery algorithms for each type of I/O control blocks. These algorithms, at step 506, interrogate the TCB to locate the control block type to be recovered, and then, at step 510, execute the algorithm logic to recover the control block. A more detailed description of the TCB use and recovery using this invention is given below.

TCB Validation during Control Block Recovery Sequence
The TCBs are validated at entry to the I/O Control Block Recovery code. The advantages of this validation are:
 1. Verification that the failing PU actually has the control blocks locked.
 2. Verification of the control block addresses locked by a failing PU to reduce the likelihood of recovery code using a bad address and causing a program check during recovery.
 3. Detection of control block corruption or damage due to storage overlays by microcode.
 4. Ensuring the correct recovery algorithms are executed to recover the failing PU.

TCB Validation Low-Level Details
For each PU requiring recovery, validate each of its TCB contents. The preferred steps are:
 1. Examine the TCB Control Block Address (CBA) arrays (TCB Words 32-63). If there are any duplicate Control Block addresses in the array, remove them from the TCB.
 2. Examine the CBM bits (TCB Word 2). For each bit in the CBM that is set, verify that the corresponding address in the TCB CBA array is with the Hardware System Area (HSA) address range. If the address is not within the HSA range, remove the Control Block entry from the TCB CBM.
 3. Examine the Control Block located in HSA for the correct Control Block Code. If the Control Block Code does not match the Control Block code found in the TCB CB Code (CBC) array (TCB Words 28-31), then correct the TCB Control Block code array entry. Create an informational System Reference Code (SRC) to record this discrepancy for engineering analysis.

4. Examine the Control Block in HSA identified by the TCB CBC array. If not locked, reset the corresponding TCB CBM bit. Otherwise set the Hardware System Recovery (HSR) Bit in the Control Block lock. For Millicode TCBs, update the Control Block Lock Word (Control Block Word 0, Byte 2) with the TCB Control Block Index.

5. Examine the TCB CBA entries to validate the Control Block is located in the correct storage range for that control block type. If the control block is not located in the correct storage range, this is considered a microcode error, and returns a non-zero return code to the recovery algorithm.

TCB Usage by I/O Control Block Recovery Algorithms

The I/O Control Block Recovery is a hierarchical sequence of Control Block Type specific algorithms. These algorithms preferably use the infrastructure described herein to manage their execution. It may be noted that preferably a PU will be selected to perform the required recovery action.

TCB Usage by I/O Control Block Recovery Algorithms Low-Level Details

To illustrate the usage of the infrastructure disclosed herein, an example of Control Block recovery will be discussed.

1. The mainline recovery algorithm dispatches an I/O Control Block specific algorithm.

2. The specific algorithm receives control. This algorithm now invokes a TCB interface routine to interrogate the TCBs for the specific type of Control Block code to be recovered.

3. The interface routine will:
   a. Locate the TCBs for the failing PU.
   b. Interrogate the TCB Control Block Mask and TCB Control Block Code array to locate a matching control block code.
   c. If a match occurs, locate the TCB Control Block Address array information for this Control Block.
   d. Update the internal controls to record the current TCB location and TCB slot address for the next invocation of this routine.
   e. Return the Control Block address to the specific control block recovery algorithm.

4. The specific control block recovery algorithm then uses this control block address to locate the control block and do these steps:
   a. Perform the recovery step per the specific algorithm.
   b. Unlock the control Block.
   c. Clear the TCB entry for this control Block.

The preferred embodiment of the invention provides a number of important advantages. For example, the invention may be used to provide significant improvement in the recovery time, especially for larger configurations.
   a. Improved system throughput because shared resources will be freed up faster.
   b. Reduced impact to time-critical functions that required System Assist Processor (SAP) resources.

Also, with the preferred embodiment of the invention, the system recovery time is nearly constant, instead of scaling with the size of the configurations, thus removing a major inhibitor to even larger configurations. Further, more validation of controls blocks is enabled because additional information is stored in the lock word and TCB.

In addition, the invention may be used to allow development of new applications to improve the overall reliability of future generations because of the availability of the new infrastructure described herein, and to provide improved diagnostics with lock word changes to include a "routine id" to identify the code segment that had locked the control block.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of tracking real time use of I/O control blocks on a processing unit basis in a multiprocessing computing system including a plurality of processing units, wherein said I/O control blocks are used to serialize processing unit operations in said computing system, the method comprising:
   assigning a task control block to each of the processing units;
   each of the processing units, locking a plurality of I/O control blocks for exclusive use by the processing unit in order to serialize processing unit operations, including the steps of using specified routines to lock the I/O control blocks for exclusive use by the processing units, and identifying in each of the locked I/O control blocks the routine used to lock the control block;
   for each of the processing units, maintaining in the task control block assigned to the processing unit, a list of all of the plurality of I/O control blocks locked by the processing unit; and
   in the event of a defined failure of one of the processing units, using the list, in the task control block assigned to said one of the processing units, of the I/O control blocks locked by said one of the processing units, to identify and to determine, the locations of all of the plurality of control blocks locked by said one of the processing units; and
   using information in the task control block assigned to said one of the processing units to release all of said identified control blocks, in said list in the task control block assigned to said one of the processing units, from the lock by said one of the processing units to facilitate recovery of the computing system from said defined failure.

2. A method according to claim 1, wherein each of the I/O control blocks includes a lock word, and the locking step includes the step of identifying in each of the locked I/O control blocks, the processing unit for which the I/O control block is locked.

3. A method according to claim 2, comprising the further step of each of the processing units unlocking the I/O control blocks locked by the processing units, including the step of said each of the processing units erasing the identification of the processing unit from each of the I/O control blocks locked by said processing unit.

4. A method according to claim 1, comprising the further step of each of the processing units unlocking the I/O control blocks locked by the processing unit, including the step of erasing from the task control block assigned to the processing unit the identification of the I/O control blocks locked by said processing unit.

5. A tracking system for tracking real time use of I/O control blocks in a multiprocessing computing system including a plurality of processing units and wherein in operation of the computing system, a plurality of I/O control blocks are locked for exclusive use by individual ones of the processing units, wherein said I/O control blocks are used to serialize processing unit operations in said computing system and wherein specified routines are used to lock the I/O control blocks for exclusive use by the processing units, and each of the locked I/O control blocks identifies the routine used to lock the control block, the tracking system comprising:

a plurality of task control blocks;

means for assigning one of the task control blocks to each of the processing units;

means for maintaining in each of the task control blocks, a list of all of the I/O plurality of control blocks locked for exclusive use by the processing unit to which the task control block is assigned; and for in the event of a defined failure of one of the processing units, using the list, in the task control block assigned to said one of the processing units, of the I/O control blocks locked by said one of the processing units, to identify and to determine the locations of all of the plurality of control blocks locked by said one of the processing units; and using information in the task control block assigned to said one of the processing units to release all of said identified control blocks, in said list in the task control block assigned to said one of the processing units, from the lock by said one of the processing units to facilitate recovery of the computing system from said failure.

6. A tracking system according to claim 5, wherein each of the I/O control blocks includes a lock word including a field for identifying the processing unit for which the I/O control block is locked.

7. A tracking system according to claim 5, wherein each of the task control blocks includes a first field for identifying the processing unit to which the task control block is assigned.

8. A tracking system according to claim 7, wherein each of the task control blocks further includes a plurality of slots for identifying addresses of I/O control blocks locked for exclusive use by the processing unit to which the task control block is assigned.

9. A tracking system according to claim 5, wherein in the operation of the computing system, I/O control blocks are unlocked from exclusive use by individual ones of the processing units, and further comprising means for operating, when I/O control blocks are unlocked from exclusive use by one of the processing units, to erase the identification of said unlocked I/O control blocks from the task control block assigned to said one of the processing units.

10. A method of state tracking and recovery in a multiprocessing computing system including a plurality of processing units, a plurality of I/O control blocks, and a plurality of task control blocks, wherein said I/O control blocks are used to serialize processing unit operations in said computing system, the method comprising the steps of:

assigning one of the task control blocks to each of the processing units;

locking a plurality of I/O control blocks for exclusive use by individual ones of the processing units in order to serialize processing unit operations, including the steps of using specified routines to lock the I/O control blocks for exclusive use by the processing units, and identifying in each of the locked I/O control blocks the routine used to lock the control block;

maintaining in the task control block assigned to each of the processing units, a list of all of the plurality of I/O control blocks locked for the processing unit;

in the event of a defined failure of one of the processing units, using the list, in the task control block assigned to said one of the processing units, of the I/O control blocks locked by said one of the processing units, to identify and to determine the locations of all of the plurality of control blocks locked by said one of the processing units; and using information in the task control block assigned to said one of the processing units to release all of said identified control blocks, in said list in the task control block assigned to said one of the processing units, from the lock by said one of the processing units to facilitate recovery of the computing system from said failure.

11. A method according to claim 10, comprising the further step of releasing said identified I/O control blocks from exclusive use by said one of the processing units.

12. A method according to claim 10, wherein said defined times are when said one of the processing units suffers a defined failure.

13. A method according to claim 10, comprising the further step of, when said one of the processing units experiences a defined type of failure, locating the task control block assigned to said one of the processing units.

14. A state tracking and recovery system in a multiprocessing computing system including a plurality of processing units, and a plurality of I/O control blocks, wherein in operation of the computing system, a plurality of said I/O control blocks are locked for exclusive use by individual ones of the processing units to serialize processing unit operations in said computing system, and wherein specified routines are used to lock the I/O control blocks for exclusive use by the processing units, and each of the locked I/O control blocks identifies the routine used to lock the control block, said state tracking and recovery system comprising:

a plurality of task control blocks;

means for assigning one of the task control blocks to each of the processing units;

means for maintaining in each of the task control blocks, a list of all of the plurality of I/O control blocks locked for exclusive use by the processing unit to which the task control block is assigned; and means for, in the event of a defined failure of one of the processing units, using the list, in the task control block assigned to said one of the processing units, of the I/O control blocks locked by said one of the processing units, to identify and to determine the locations of all of the plurality of control blocks locked by said one of the processing units; and using information in the task control block assigned to said one of the processing units to release all of said identified control blocks, in said list in the task control block assigned to said one of the processing units, from the lock by said one of the processing units to facilitate recovery of the computing system from said failure.

15. A state tracking and recovery system according to claim 14, further comprising means for releasing said identified I/O control blocks from said exclusive use by said one of the processing units.

16. A state tracking and recovery system according to claim 15, further comprising means operating, when said identified I/O control blocks are released from said exclusive use by said one of the processing units, to erase from the task control block assigned to said one of the processing units, the identification of said released I/O control blocks.

17. A method according to claim 1, wherein the identifying step includes the steps of
when one of the processing units suffers a defined failure:
i) locating the one of the task control blocks assigned to said one of the processing units,
ii) dispatching memory algorithms, iii) using the memory algorithms to interrogate said one of the task control blocks to identify all of the I/O control blocks locked by said one of the processing units, and iv) executing one or more of the memory algorithms to recover said all of the I/O control blocks locked by said one of the processing units.

18. The method according to claim 1, wherein each of the I/O control blocks defines a lock word structure including a unique routine identification code to track task usage of said each I/O control block.

19. The method according to claim 17, wherein:

each of the task control blocks includes a control block mask indicating that one of the control blocks is locked, a control block code array containing control block code of said locked one of the control blocks, and a control block address array containing an address of said locked one of the control blocks; and the step of using the memory algorithm includes the steps of interrogating the control block mask and the control block code array to locate a matching control block code, locating information in the control block address array, and returning the control block address to a specific one of the memory algorithms.

* * * * *